(12) United States Patent  
Danaj et al.

(10) Patent No.: US 8,371,639 B2
(45) Date of Patent: Feb. 12, 2013

(54) SNAP FIT BRACKET FOR SIDE DOOR IMPACT BEAM

(75) Inventors: Kenneth G. Danaj, Sterling Heights, MI (US); Shunmugam Baskar, West Bloomfield, MI (US); Sarah J. Pike, Warren, MI (US); Raymond Lyszczarz, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/904,196

(22) Filed: Oct. 14, 2010

(65) Prior Publication Data

US 2012/0091750 A1    Apr. 19, 2012

(51) Int. Cl.
    *B60J 5/04*    (2006.01)
(52) U.S. Cl. .................. 296/146.6; 296/187.12; 49/502
(58) Field of Classification Search .............. 296/146.6, 296/187.12, 187.03, 1.03, 146.5; 49/502
    See application file for complete search history.

(56) References Cited

U.S. PATENT DOCUMENTS

| 5,755,484 A | 5/1998 | Chou et al. |
| 6,135,541 A * | 10/2000 | Geise et al. .................. 296/1.03 |

FOREIGN PATENT DOCUMENTS

| DE | 9215014 U1 | 12/1992 |
| DE | 4338249 B4 | 3/2005 |
| DE | 102005012969 A1 | 10/2005 |

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A door assembly for a vehicle includes an exterior panel and an impact beam coupled to the exterior panel and spaced from an interior surface of the exterior panel a gap distance. A bracket is attached to the impact beam via a snap fit connection. The bracket includes an outboard surface disposed between the impact beam and the interior surface to at least partially span the gap distance. The snap fit connection allows for repositioning and removal of the bracket from the door assembly without negatively affecting the structural integrity of the impact beam.

20 Claims, 3 Drawing Sheets

SNAP FIT BRACKET FOR SIDE DOOR IMPACT BEAM

TECHNICAL FIELD

The invention relates generally to a door assembly for a vehicle, and more specifically to a bracket coupled to an impact beam of the door assembly for supporting a cushioning compound to maintain a bond between a door impact beam and an exterior panel of the door assembly.

BACKGROUND

Door assemblies for vehicles include an impact beam that is attached to and extends between a first edge and a second edge of the door. The impact beam increases resistance against side impacts. The impact beam may be spaced from an interior surface of an exterior panel, i.e., skin, of the door assembly. In order to prevent undesirable noise and/or vibration in the exterior panel when opening and closing the door, a cushioning compound may be disposed between the impact beam and the exterior panel of the door assembly. The cushioning compound reduces and/or prevents vibration in the exterior panel.

The cushioning compound is only capable of spanning a maximum expansion distance. Accordingly, the impact beam must be disposed within the maximum expansion distance from the interior surface of the exterior panel. Additionally, during a painting process, the door assembly may be positioned such that a pressure applied to an exterior surface of the exterior panel is greater than the pressure applied to the interior surface of the exterior panel, thereby causing the exterior panel to flex inward toward the impact beam. This may be referred to as "oil canning". If the door assembly flexes inward during the painting process, the exterior panel may compress the cushioning compound, thereby separating the cushioning compound from the exterior panel once the exterior panel rebounds back into its initial shape after the painting process, which may lead to undesirable vibration and/or noise in the door assembly.

SUMMARY

A door assembly for a vehicle is provided. The door assembly includes an exterior panel. The exterior panel defines an interior surface, and includes a first edge and a second edge spaced from the first edge along a longitudinal axis. An impact beam is coupled to the exterior panel adjacent the first edge and the second edge of the exterior panel. The impact beam is spaced from the interior surface of the exterior panel a gap distance. A bracket is coupled to the impact beam. The bracket includes an outboard surface that opposes the interior surface of the exterior panel. The outboard surface is disposed between the impact beam and the interior surface. The outboard surface at least partially spans the gap distance between the impact beam and the interior surface. A snap fit connection interconnects the bracket and the impact beam. The snap fit connection is configured for allowing positional adjustment of the bracket relative to the impact beam along the longitudinal axis, and for allowing removal of the bracket from the impact beam.

A door assembly for a vehicle is also provided. The door assembly includes an exterior panel defining an interior surface. An impact beam is coupled to the exterior panel. The impact beam is spaced from the interior surface of the exterior panel a gap distance. A bracket is coupled to the impact beam. The bracket includes an outboard surface that opposes the interior surface of the exterior panel. The outboard surface is disposed between the impact beam and the interior surface. The outboard surface at least partially spans the gap distance between the impact beam and the interior surface. A snap fit connection interconnects the bracket and the impact beam while maintaining an original structural integrity of the impact beam. The snap fit connection is configured for allowing positional adjustment of the bracket relative to the impact beam along the longitudinal axis, and for allowing removal of the bracket from the impact beam.

Accordingly, the bracket may be easily snap fit onto the impact beam to support the exterior panel during a painting process to prevent the exterior panel from flexing inward toward the impact beam and compressing a cushioning compound disposed between the impact beam and the exterior panel. Alternatively, the outboard surface of the bracket may close the gap distance sufficiently to enable the cushioning compound to be disposed between the outboard surface of the bracket and the interior surface of the exterior panel when the gap distance is greater than a maximum expansion distance of the cushioning compound. The snap fit connection between the bracket and the impact beam allows for easy positioning and re-positioning of the bracket, as well as for removal of the bracket, all without negatively affecting the structural integrity or strength of the impact beam.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a door assembly is shown generally at 20. The door assembly 20 is for a vehicle. The door assembly 20 may include, but is not limited to, a side passenger door for the vehicle. The door assembly 20 may be sized, shaped and/or configured in any suitable manner necessary to meet the design considerations of the vehicle.

Figure 1:
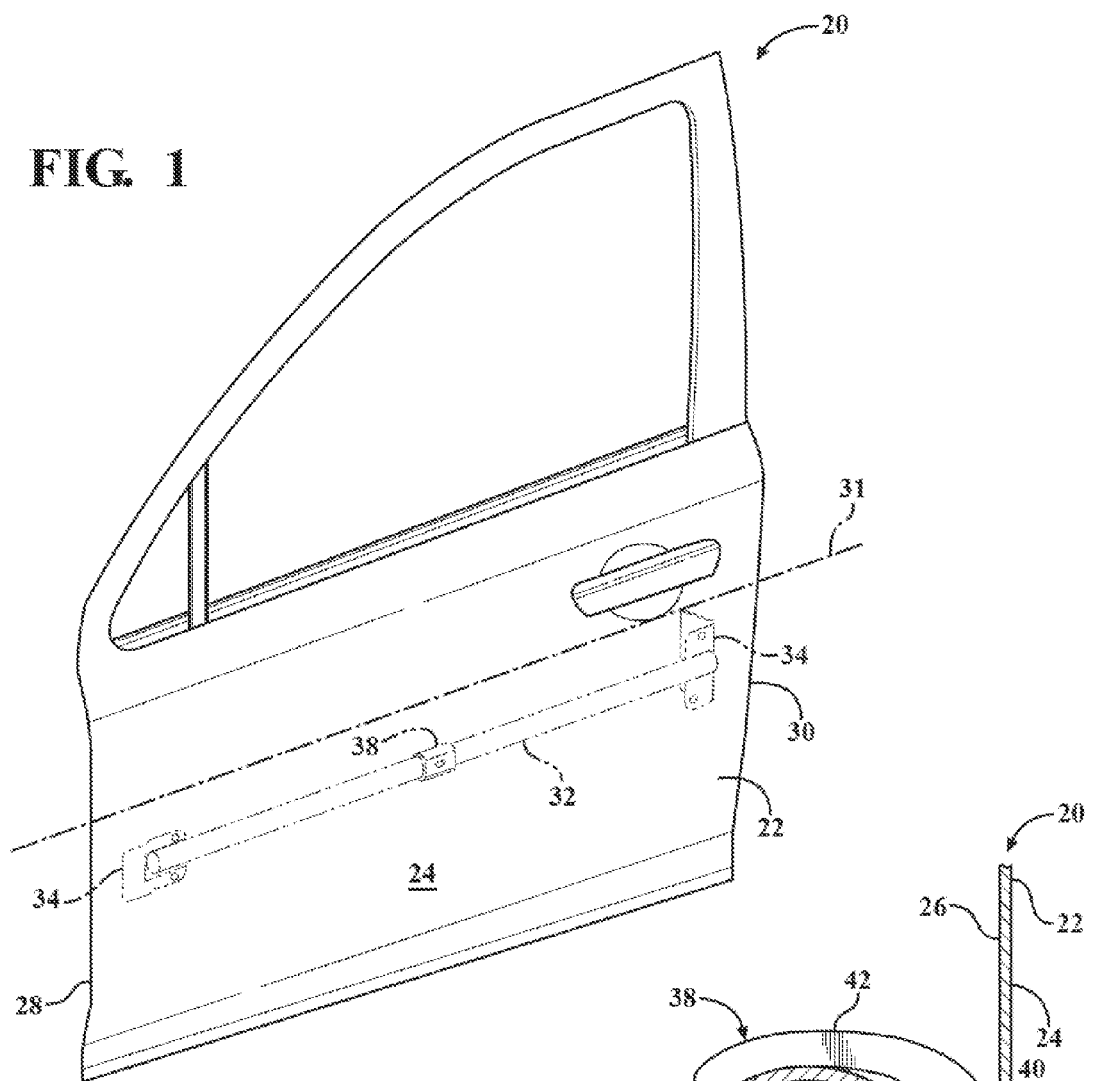
FIG. 1 is a schematic perspective view of a door assembly for a vehicle.
Figure 2:
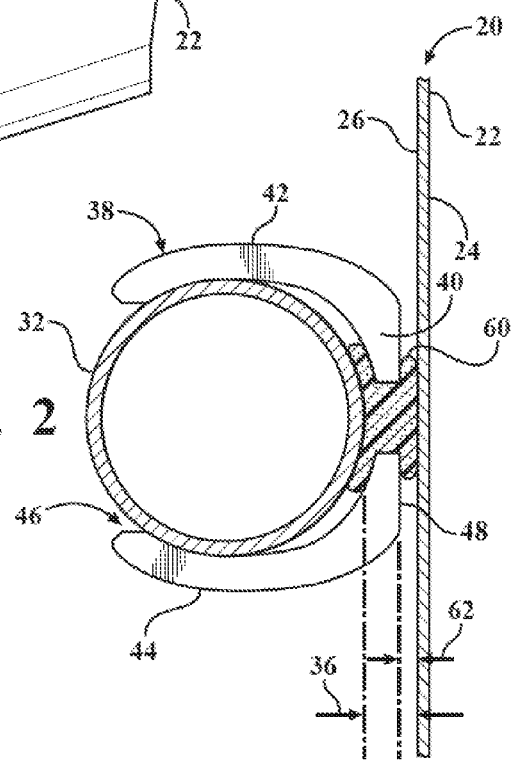
FIG. 2 is a schematic cross sectional view perpendicular to a longitudinal axis of an impact beam and a bracket of the door assembly.

Referring to FIGS. 1 and 2, the door assembly 20 includes an exterior panel 22. The exterior panel 22 forms the outer skin of the door assembly 20. Accordingly, the exterior panel 22 defines an outer surface 24 disposed on an exterior of the vehicle, and an interior surface 26 (shown in FIG. 2) disposed on an interior of the vehicle, i.e., an interior of the door. The exterior panel 22 may be shaped in any suitable manner to meet the design and/or aesthetic requirements of the vehicle.

The exterior panel 22 includes a first edge 28 and a second edge 30. The second edge 30 is spaced from the first edge 28 along a longitudinal axis 31. As shown, the first edge 28 is a front edge of the door, and the second edge 30 is a rear edge of the door. However, it should be appreciated that the respective positions of the first edge 28 and the second edge 30 may be reversed from that shown in the Figures.

Figure 3:
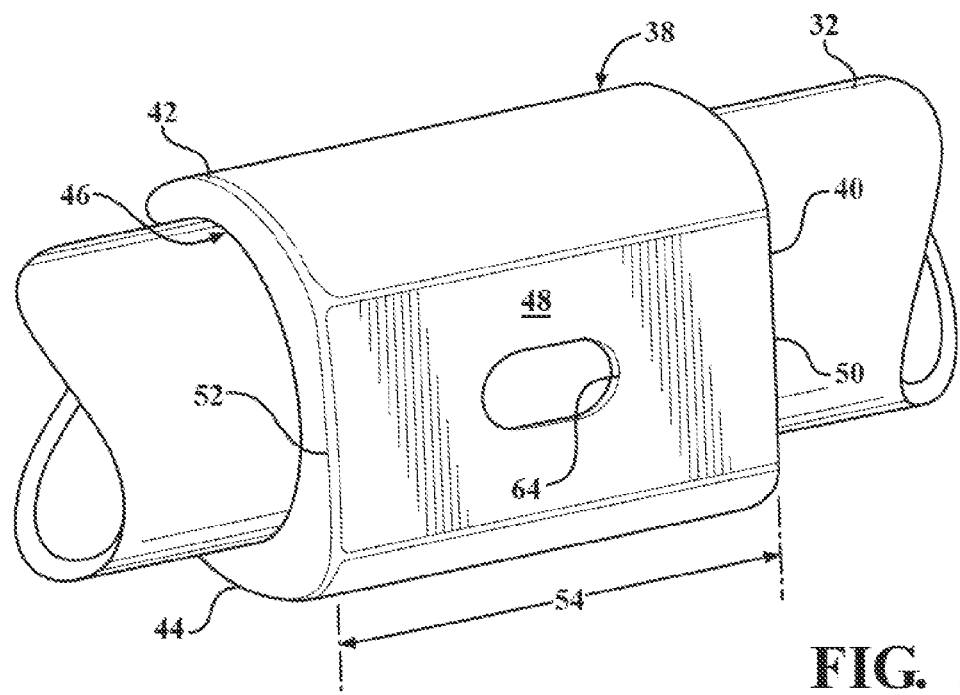
FIG. 3 is an enlarged schematic perspective view of the impact beam and the bracket.
Figure 5:
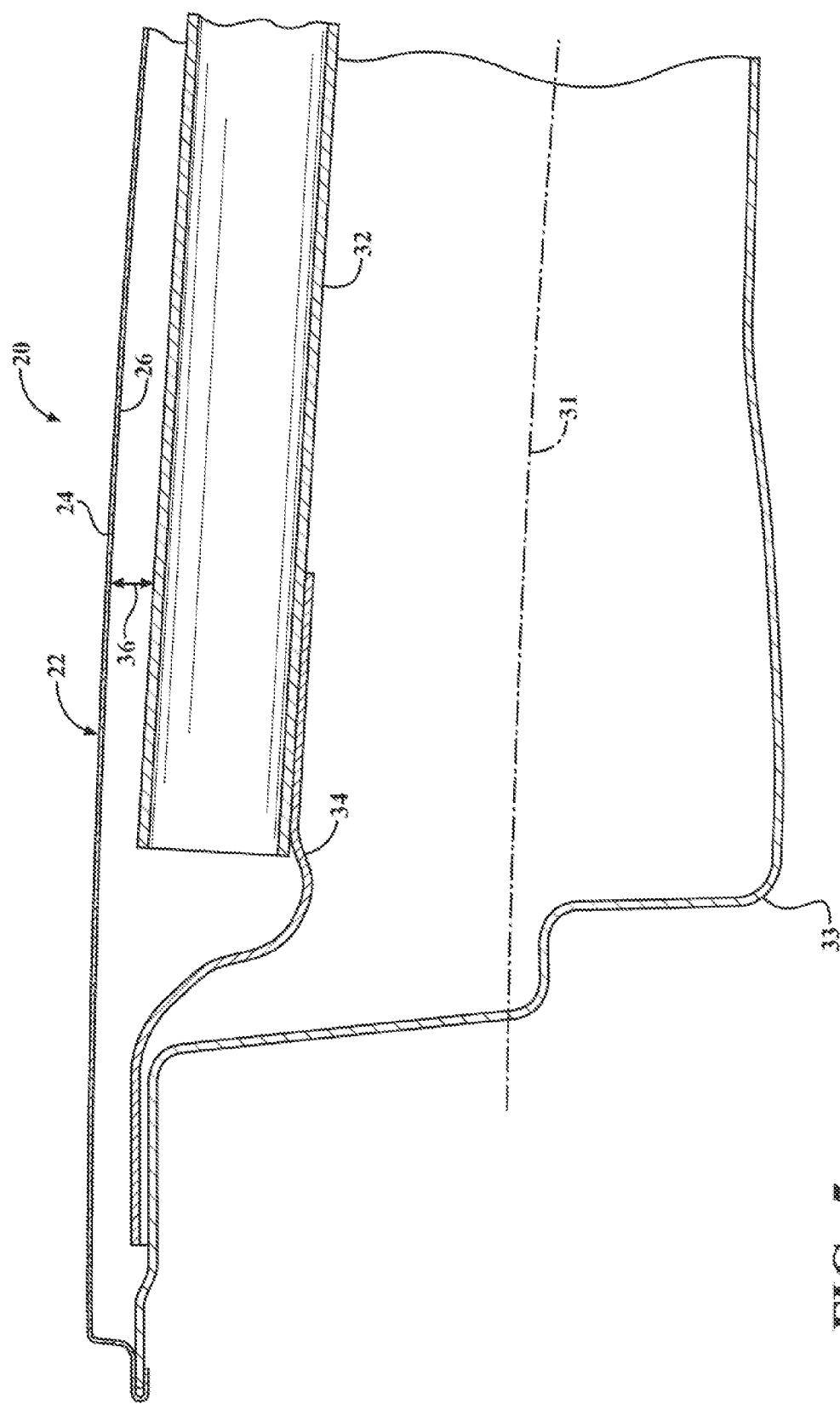
FIG. 5 is a schematic fragmentary cross sectional view of the door assembly.

Referring also to FIGS. 3 and 5, an impact beam 32 is coupled to the exterior panel 22. The impact beam 32 may be directly attached to the exterior panel 22, but as shown in FIG. 5, the impact beam 32 is preferably coupled to the exterior panel 22 via an interior panel 33. The impact beam 32 is coupled to the interior panel 33 adjacent the first edge 28 and the second edge 30. The impact beam 32 may be coupled to the interior panel 33 in any suitable manner. The impact beam 32 may be directly coupled to the interior panel 33, or may be indirectly coupled to the interior panel 33 through other components. For example, the impact beam 32 may be coupled to the interior panel 3 via a pair of supports 34 (shown in FIGS. 1 and 5) disposed at opposite ends of the impact beam 32. While the impact beam 32 is shown in a substantially horizontal position, it should be appreciated that the impact beam 32 may be positioned more diagonally, with an end of the impact beam 32 positioned relatively higher near the first edge 28 of the door assembly 20, and a second end of the impact beam 32 positioned relatively lower near the second edge 30 of the door assembly 20.

Referring to FIG. 2, the impact beam 32 is spaced from the interior surface 26 of the exterior panel 22 a gap distance 36. The gap distance 36 is the minimum distance perpendicular to the longitudinal axis 31 from a point on the impact beam 32 to the interior surface 26 of the exterior panel 22.

As shown in FIG. 2, the impact beam 32 may include a cross section having a circular shape perpendicular to the longitudinal axis 31. However, it should be appreciated that the impact beam 32 may alternatively include a stamped beam having another suitable cross sectional shape, including but not limited to, a U-shaped cross sectional shape, a Z-shaped cross sectional shape, an H-shaped cross sectional shape or an L-shaped cross sectional shape.

Figure 4:
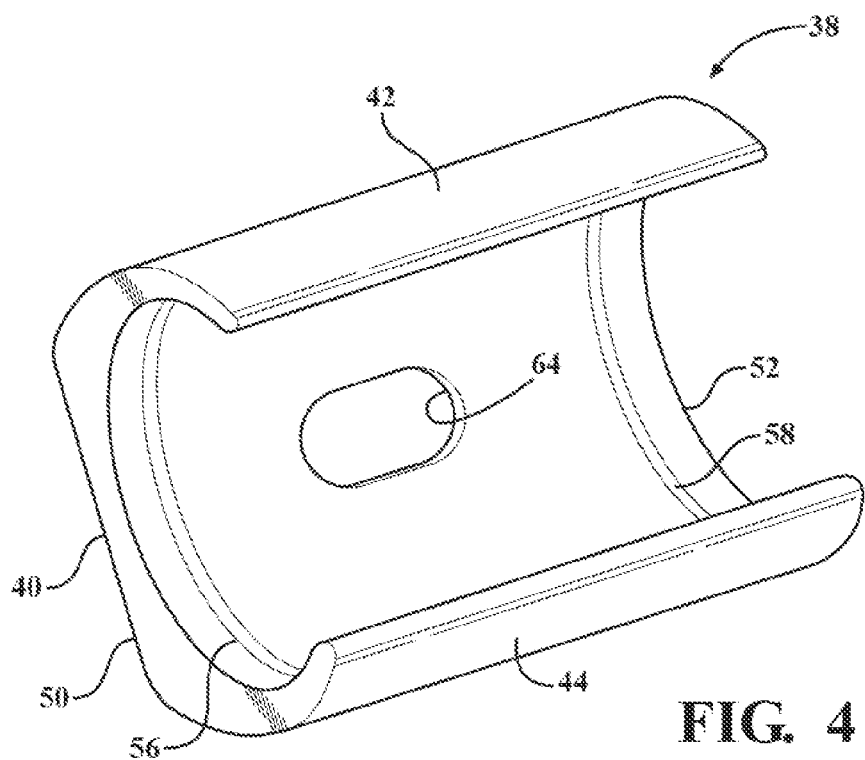
FIG. 4 is a schematic perspective view of the bracket.

Referring to FIGS. 1 through 4, a bracket 38 is coupled to the impact beam 32. The bracket 38 may include and be manufactured from a polymer material, including but not limited to a plastic material or a nylon material; or any metallic material. Referring specifically to FIGS. 2 and 4, the bracket 38 includes a central portion 40, a first arm portion 42 and a second arm portion 44. The first arm portion 42 and the second arm portion 44 are generally offset from each other and are disposed on opposite sides of the central portion 40. The first arm portion 42 extends away from the central portion 40 and toward the impact beam 32. The second arm portion 44 is spaced from the first arm portion 42 across the central portion 40, and extends away from the central portion 40 and toward the impact beam 32. The first arm portion 42 and the second arm portion 44 cooperate to define a snap fit connection 46 (described in greater detail below) interconnecting the bracket 38 and the impact beam 32.

As shown, the bracket 38 includes a cross section having a generally C-shaped configuration perpendicular to the longitudinal axis 31. In other words, the first arm portion 42, the central portion 40 and the second arm portion 44 cooperate together to define a cross sectional shape perpendicular to the longitudinal axis 31 that defines the generally C-shaped configuration. However, it should be appreciated that the cross sectional shape of the bracket 38 may differ from the generally C-shaped configuration shown, and that the cross sectional shape of the bracket 38 corresponds to and mates with the cross sectional shape of the impact beam 32 to snap onto the impact beam 32. For example, the bracket 38 may include a U-shaped cross sectional shape configured to mate with a stamped impact beam having a U-shaped cross sectional shape, a Z-shaped cross sectional shape or an H-shaped cross sectional shape.

Referring also to FIG. 3, the central portion 40 defines an outboard surface 48 that opposes the interior surface 26 of the exterior panel 22. The outboard surface 48 is disposed between the impact beam 32 and the interior surface 26, and at least partially spans the gap distance 36 between the impact beam 32 and the interior surface 26. The outboard surface 48 of the bracket 38 defines a cross sectional profile perpendicular to the longitudinal axis 31 that is complimentary in shape to the interior surface 26 of the exterior panel 22. Accordingly, if the bracket 38 spans the entire gap distance 36 such that the outboard surface 48 of the bracket 38 is disposed directly against the interior surface 26 of the exterior panel 22, the cross sectional profile of the outboard surface 48 matches and/or mates with the interior surface 26 of the exterior panel 22.

As best shown in FIG. 4, the bracket 38 includes a first longitudinal end 50 and a second longitudinal end 52. The second longitudinal end 52 is spaced from the first longitudinal end 50 a length 54 along the longitudinal axis 31. The bracket 38 may further include a first ridge 56 and a second ridge 58. The second ridge 58 is disposed adjacent the first longitudinal end 50 of the bracket 38, and extends around an inner circumference of the bracket 38, radially inward toward the impact beam 32. The second ridge 58 is disposed adjacent the second longitudinal end 52 of the bracket 38, and extends around the inner circumference of the bracket 38, radially inward toward the impact beam 32. The first ridge 56 and the second ridge 58 space the first arm portion 42, the central portion 40 and the second arm portion 44 from the surface of the impact beam 32.

As described above, and best shown in FIGS. 2 and 3, the snap fit connection 46 interconnects the bracket 38 and the impact beam 32. The snap fit connection 46 is configured for allowing positional adjustment of the bracket 38 relative to the impact beam 32 along the longitudinal axis 31, and for allowing removal of the bracket 38 from the impact beam 32. The snap fit connection 46 couples the bracket 38 to the impact beam 32, while maintaining an original structural integrity of the impact beam 32. Accordingly, the snap fit connection 46 allows the bracket 38 to be attached to the impact beam 32 without weakening and/or deforming the impact beam 32 from its original condition.

As shown, the first arm portion 42 and the second arm portion 44 are configured to grasp the impact beam 32 to define the snap fit connection 46. However, it should be appreciated that the snap fit connection 46 may include some other configuration not shown or described herein that allows for the press on attachment to the impact beam 32, and for the repositioning and/or removal of the bracket 38 from the impact beam 32, without the need for welding, gluing, or otherwise fastening the bracket 38 to the impact beam 32.

Referring to FIG. 2, the door assembly 20 may include a cushioning compound 60. The cushioning compound 60 is disposed between the impact beam 32 and the interior surface 26 of the exterior panel 22. The cushioning compound 60 reduces and/or eliminates vibration and noise in the exterior panel 22 caused by movement of the exterior panel 22. The cushioning compound 60 may be referred to as a mastic material or an anti-flutter material.

The cushioning compound 60 includes a maximum expansion distance. The maximum expansion distance is the distance the cushioning compound 60 may extend outward from the impact beam 32 to contact the interior surface 26 of the exterior panel 22. If the gap distance 36 is greater than the maximum expansion distance, then the cushioning compound 60 may not be able to span across the gap distance 36 to effectively engage the exterior panel 22. If the gap distance 36 is greater than the maximum expansion distance, the outboard surface 48 may be spaced from the interior surface 26 a reduced gap distance 62. The reduced gap distance 62 is equal to or less than a numerical difference between the gap distance 36 and the maximum expansion distance. This ensures that the distance between the outboard surface 48 of the bracket 38 and the interior surface 26 of the exterior panel 22 is less than the maximum expansion distance so that the cushioning compound 60 may be disposed between the bracket 38 and the exterior panel 22, and completely span the reduced gap distance 62.

Referring also to FIGS. 3 and 4, the bracket 38 may include at least one aperture 64. The aperture 64 extends through the outboard surface 48, transversely relative to the impact beam 32. The cushioning compound 60 may extend through the at least one aperture 64, into contact with the impact beam 32. In so doing, the cushioning compound 60 may be positioned in direct contact with both the impact beam 32 and the exterior panel 22, even when the gap distance 36 is greater than the maximum expansion distance.

Alternatively, if the gap distance 36 is less than the maximum expansion distance, the bracket 38 may limit movement of the exterior panel 22 inward toward the impact beam 32. Limiting inward movement of the exterior panel 22 relative to the impact beam 32 prevents compression of the cushioning compound 60 in the event a force is applied to the exterior panel 22 that may cause the exterior panel 22 to flex inward toward the impact beam 32.

While the best modes for carrying out the invention have been described in detail, those familiar with the art to which this invention relates will recognize various alternative designs and embodiments for practicing the invention within the scope of the appended claims.

The invention claimed is:

1. A door assembly for a vehicle, the door assembly comprising:
   an exterior panel defining an interior surface and having a first edge and a second edge spaced from the first edge along a longitudinal axis;
   an impact beam coupled to the exterior panel adjacent the first edge and the second edge of the exterior panel, and spaced from the interior surface of the exterior panel a gap distance; and
   a bracket coupled to the impact beam and including an outboard surface opposing the interior surface of the exterior panel, wherein the outboard surface of the bracket is disposed between the impact beam and the interior surface to at least partially span the gap distance between the impact beam and the interior surface;
   wherein the bracket is configured to provide a snap fit connection interconnecting the bracket and the impact beam and configured for allowing positional adjustment of the bracket relative to the impact beam along the longitudinal axis and removal of the bracket from the impact beam.

2. A door assembly as set forth in claim 1 wherein the snap fit connection couples the bracket to the impact beam while maintaining an original structural integrity of the impact beam.

3. A door assembly as set forth in claim 1 wherein the impact beam includes a cross section having a shape perpendicular to the longitudinal axis and the bracket includes a cross section having a shape perpendicular to the longitudinal axis, wherein the cross sectional shape of the bracket corresponds to and is configured to mate with the cross sectional shape of the impact beam.

4. A door assembly as set forth in claim 3 wherein the cross sectional shape of the impact beam includes a circular shape and the cross sectional shape of the bracket includes a generally C-shaped configuration.

5. A door assembly as set forth in claim 1 wherein the outboard surface of the bracket defines a cross sectional profile perpendicular to the longitudinal axis that is complimentary in shape to the interior surface of the exterior panel.

6. A door assembly as set forth in claim 1 wherein the bracket includes at least one aperture extending through the outboard surface transversely relative to the impact beam.

7. A door assembly as set forth in claim 6 further comprising a cushioning compound disposed between the bracket and the exterior panel.

8. A door assembly as set forth in claim 7 wherein the cushioning compound extends through the at least one aperture into contact with the impact beam.

9. A door assembly as set forth in claim 7 wherein the cushioning compound includes a maximum expansion distance and wherein the outboard surface is spaced from the interior surface a reduced gap distance equal to or less than a numerical difference between the gap distance and the maximum expansion distance.

10. A door assembly as set forth in claim 7 wherein the bracket limits movement of the exterior panel toward the impact beam to prevent compression of the cushioning compound.

11. A door assembly as set forth in claim 1 wherein the bracket includes a central portion defining the outboard surface, a first arm portion extending away from the central portion, and a second arm portion spaced from the first arm portion across the central portion and extending away from the central portion, wherein the first arm portion and the second arm portion are configured to grasp the impact beam to define the snap fit connection.

12. A door assembly as set forth in claim 11 wherein the bracket includes a first longitudinal end and a second longitudinal end spaced from the first longitudinal end along the longitudinal axis, and further includes a first ridge disposed adjacent the first longitudinal end and extending around an inner circumference of the bracket and radially inward, and a second ridge disposed adjacent the second longitudinal end and extending around the inner circumference of the bracket and radially inward.

13. A door assembly for a vehicle, the door assembly comprising:
   an exterior panel defining an interior surface;
   an impact beam coupled to the exterior panel and spaced from the interior surface of the exterior panel a gap distance; and
   a bracket coupled to the impact beam and including an outboard surface opposing the interior surface of the exterior panel, wherein the outboard surface of the bracket is disposed between the impact beam and the interior surface to at least partially span the gap distance between the impact beam and the interior surface;
   wherein the bracket is configured to provide a snap fit connection interconnecting the bracket and the impact beam while maintaining an original structural integrity of the impact beam, and configured for allowing positional adjustment of the bracket relative to the impact beam along the longitudinal axis and removal of the bracket from the impact beam.

14. A door assembly as set forth in claim 13 further comprising a cushioning compound disposed between the impact beam and the exterior panel.

15. A door assembly as set forth in claim 14 wherein the cushioning compound includes a maximum expansion distance and wherein the outboard surface is spaced from the interior surface a reduced gap distance equal to or less than a numerical difference between the gap distance and the maximum expansion distance.

16. A door assembly as set forth in claim 15 wherein the bracket limits movement of the exterior panel toward the impact beam to prevent compression of the cushioning compound.

17. A door assembly as set forth in claim 13 wherein the bracket includes a central portion defining the outboard surface, a first arm portion extending away from the central portion, and a second arm portion spaced from the first arm portion across the central portion and extending away from the central portion, wherein the first arm portion and the second arm portion are configured to grasp the impact beam to define the snap fit connection.

18. A door assembly as set forth in claim 17 wherein the impact beam includes a cross section having a shape perpendicular to the longitudinal axis and the bracket includes a cross section having a shape perpendicular to the longitudinal axis, wherein the cross sectional shape of the bracket corresponds to and is configured to mate with the cross sectional shape of the impact beam.

19. A door assembly as set forth in claim 18 wherein the cross sectional shape of the impact beam includes a circular shape and the cross sectional shape of the bracket includes a generally C-shaped configuration.

20. A door assembly as set forth in claim 17 wherein the outboard surface of the bracket defines a cross sectional profile perpendicular to the longitudinal axis that is complimentary in shape to the interior surface of the exterior panel.

* * * * *